United States Patent [19]
Beard

[11] Patent Number: 5,208,967
[45] Date of Patent: May 11, 1993

[54] TUBE EXTRACTION APPARATUS

[75] Inventor: James H. Beard, Leicestershire, Great Britain

[73] Assignee: Wicksteed Engineering Limited, Northants, United Kingdom

[21] Appl. No.: 681,526

[22] PCT Filed: Oct. 20, 1989

[86] PCT No.: PCT/GB89/01245
§ 371 Date: May 9, 1991
§ 102(e) Date: May 9, 1991

[87] PCT Pub. No.: WO90/04492
PCT Pub. Date: May 3, 1990

[30] Foreign Application Priority Data
Oct. 26, 1988 [GB] United Kingdom ............... 8825063
Jan. 25, 1989 [GB] United Kingdom ............... 8901586

[51] Int. Cl.⁵ .................................................. B66F 1/08
[52] U.S. Cl. .................................... 29/726; 254/29 R
[58] Field of Search ................. 29/726, 727, 523; 254/29 R, 30

[56] References Cited
U.S. PATENT DOCUMENTS 2,356,899  8/1944  Stutter ................................. 254/30
3,507,028  4/1970  Stellatella ............................ 29/726
3,791,011  2/1974  Keys .................................... 29/726
4,434,969  3/1984  Von Rudin ........................ 254/29 R
4,586,695  5/1986  Miller ................................. 254/30
4,679,315  7/1987  Overbay .............................. 29/726
4,959,899 10/1990  Martin ................................ 29/726

FOREIGN PATENT DOCUMENTS
2045122 10/1980 United Kingdom ................. 29/726

Primary Examiner—Irene Cuda

[57] ABSTRACT

Extraction apparatus 10 for tubes and like elongated articles comprises a tiltable gripping collar 64 of fixed internal dimension to engage and grip the article to be extracted. The collar has internal dimensions somewhat larger than those of the articles to be gripped, and is mounted so as to tilt when in use and to engage and grip the article as a result of this tilting action. The collar be used either as non-return means for the article being extracted, or may be used for applying the extraction level itself. A collar assembly is however preferably used to apply the extraction load separate and apart from the tilting collar. The collar jaws a axially spaced from the end of the tubular piston rod of the ram and connected to it by a collar head whereby the assembly is removable on a quick attach basis for servicing.

6 Claims, 3 Drawing Sheets

TUBE EXTRACTION APPARATUS

This invention relates to a tube extraction apparatus for tubes and like elongated articles. An example of the application of the invention is to a tube extraction apparatus suitable for removing condenser and heat exchanger tubes from their mountings in electrical power generation stations. The invention has many other applications.

BACKGROUND OF THE INVENTION

Apparatus for extracting tubes from heat exchangers and the like has already been proposed. An example of such an apparatus is disclosed in GB 2,113,598A. However, such an apparatus is of relatively elaborate and complex structure, and this is reflected in the complexity of the mode of operation of the apparatus. Accordingly, improvements are desirable in relation to the simplifying the construction and operation of the apparatus, its cost, its space requirements, particularly axial length, and indeed its reliability. An area in such prior apparatus which particularly calls for improvement concerns the method of gripping the article to be extracted, and the present invention is particularly, though not exclusively, concerned with providing improvements in this respect.

Accordingly, an object of one aspect of the present invention is to provide an extraction apparatus for tubes and like elongated articles providing improvements in relation to one or more of the matters discussed above or generally.

According to a first aspect of the invention there is provided an extraction apparatus for tubes and like elongated articles as defined in claim 1 of the accompanying claims.

A second aspect of the invention concerns the means for applying an extraction load to the article concerned.

Prior proposals in this regard include the use of a collet assembly mounted within the tubular piston rod of the hydraulic ram assembly, whereby an extraction load is transferred radially inwards through a collet head or chuck to the collet jaws, and thus to the article.

While this prior proposal may well operate satisfactorily in laboratory test conditions, it is found that in actual normal use conditions, it is subject to significant problems and shortcomings. These concern not only the size and weight of the apparatus, but also a tendency to cease-up and jam in use, whereby the apparatus becomes unusable, service is imperative, and it is then found that it is extremely difficult to detach the jammed collet assembly for servicing purposes, and later to replace it.

Accordingly, it is an object of this second aspect of the present invention to provide improvements in relation to one or more of the matters discussed and disclosed herein, or generally.

SUMMARY OF THE INVENTION

The present invention relates to apparatus for effecting stepwise, lengthwise movement of elongated articles such as tubes. The apparatus includes gripping means for the article, thrust means for operating the gripping means and applying a load longitudinally of the article, and the gripping means includes a collar to encircle the article and grip it by tilting relative to the longitudinal axis of the article. The thrust means includes a fluid operated motor or hydraulic cylinder. In further accordance with the present invention such an apparatus is adapted for extracting tubes by providing primary and secondary gripping means operable in sequence in order to provide for extraction in one direction of movement and then to provide for a return movement with a holding effect such as will inhibit elastic return movement of the elongated article or tube being extracted. The fluid motor or cylinder is disposed coaxially with respect to the axis of the elongated article or tube, and the primary gripping means applies the extraction load through a series of radially movable jaw elements. The secondary gripping means comprises a collar that is effective to inhibit elastic return movement of the tube between the successive extraction steps carried out by the primary gripping means.

BRIEF DESCRIPTION OF THE PREFERRED EMBODIMENT

Figure 1:
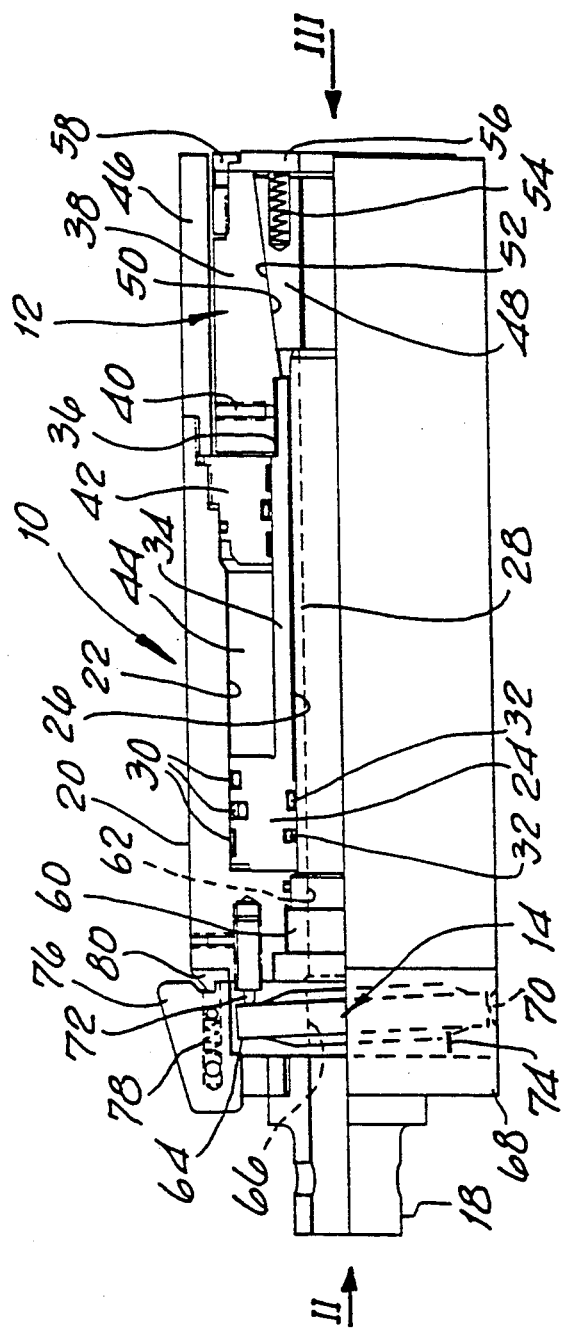
FIG. 1 shows an axial section through extraction apparatus for tubes and like elongated articles.
Figure 3:
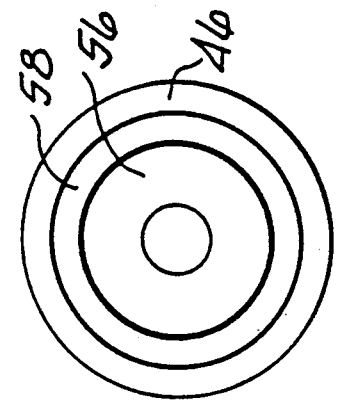
FIG. 3 shows an end elevation view of the opposite end of the apparatus of FIG. 1, the direction of viewing being indicated by arrow III in FIG. 1.
Figure 2:
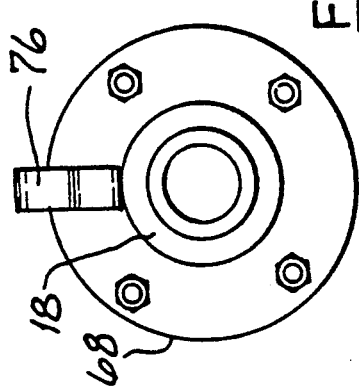
FIG. 2 shows an end elevation view of the apparatus of FIG. 1, the direction of viewing being indicated by arrow II in FIG. 1.

As shown in the drawings, an extraction apparatus 10 for tubes and like elongated articles comprises primary and secondary article gripping means, 12, 14, and thrust means 16 to apply an extraction load to the article.

Broadly speaking, the apparatus 10 operates by causing primary article gripping means 12 to engage and grip the article to be extracted (not shown), and to apply to it an extraction load generated by thrust means 16. The article is moved in the direction from left to right in FIG. 1. In this direction, secondary article gripping means 14 permits the article to move through it, while reaction thrust is applied to the tube assembly by a reaction collar 18. After one stroke of the thrust means, it returns to take a second stroke. During this period the secondary article gripping means prevents return movement (in the right to left direction in FIG. 1) of the article being extracted. This extraction cycle is repeated to provide stepwise extraction of elongated articles.

Looking now at the general structure of apparatus 10, it will be seen that it comprises a cylinder 20 having an internal bore 22 in which a piston 24 slides. The piston is annular in form and has an internal periphery 26 slidingly and sealingly engaging the outer periphery of a centre tube or stem 28. Piston 24 has annular seals 30, 32 at both its outer and inner peripheries.

Piston 24 has a tubular rod or stem 34 which likewise slides on centre tube 28 and is formed with a screw-threaded portion 36 of slightly reduced external diameter on which a cylindrical head 38 is screw-threadedly received, and locked in position by a grub screw 40.

Piston rod 34 slides in a cylinder end block 42 which is axially fixed within cylinder 20 and provided with seals so as to define a fluid tight annular rod-side chamber 44, whereby piston 24 can be actuated in a double-acting manner. Cylinder 20 has an extension portion 46 in which head 38 is freely received in the fully-retracted position shown in FIG. 1.

A collet 48 is mounted within the tapering internal periphery 50 of head 38 and has a complementary tapering external periphery 52 to co-operate therewith. Axially-extending springs 54 are received in bores in the collet and act against an end plate 56 retained by a cap 58 which is screw-threaded on head 38. Springs 54 load the separate portions of collet 48 axially inwards and, by virtue of the ramp effect of the tapering profiles 50, 52, the collet is thus biased inwardly to engage and grip a tube or other article to be pulled.

Figure 4:
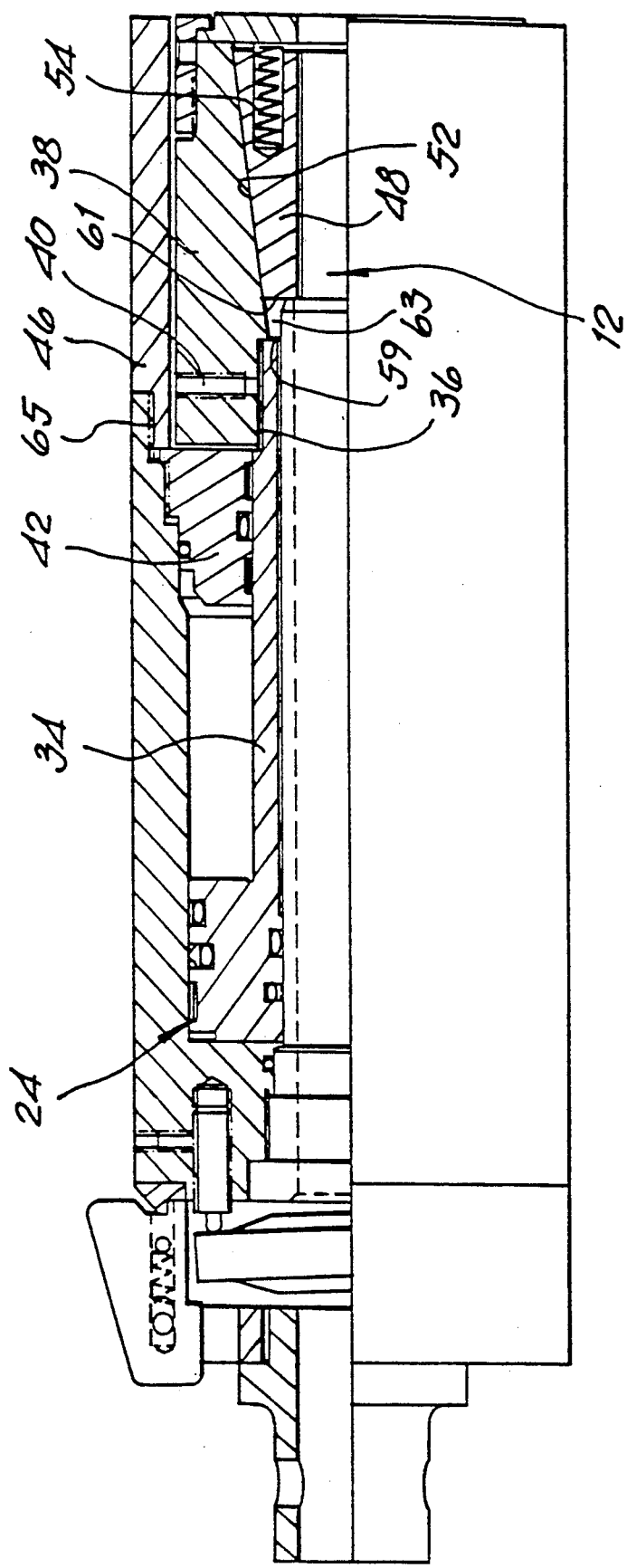
FIG. 4 shows the apparatus of FIG. 1 on a larger scale so as to illustrate, for the purpose of describing the primary article gripping means therein, the structure and arrangement and relative dispositions of the component parts thereof.

Referring now to FIG. 4, the structure and arrangement of the primary article gripping means 12 in relation to piston 24 and the rod or stem 34 thereof in particular, will now be considered in more detail in relation to FIG. 4.

It will be seen that extraction load applied to the head side of piston 24 is transferred via piston rod 34, screw-threads 36, collet head or chuck 38, ramp 52, and thus to the collet elements or jaws 48 themselves. Head 38 constitutes mounting means for elements 48. It is quickly attachable/detachable by virtue of the screw-thread 36 and the grub screw 40, whereby the entire collet assembly can be quickly attached/detached for servicing purposes.

It can be clearly seen from FIG. 4 that the collet elements 48 are located such that they are axially spaced from the axially outer end 59 of the piston rod or stem 34. FIG. 4 shows the fully axially retracted position of the elements 48, in which their axially inner ends 61 are spaced apart from piston rod end 59 by a discrete distance. For the purpose of the invention, it would not be out of the question for actual contact to be made.

The space 63 between the ends 59 and 61 has a particular significance in relation to this aspect of the present invention, namely that it illustrates the extremely limited volume available within the apparatus, between the end of the piston and the collet jaws or elements 48, in which any foreign matter could conceivably accumulate, though in practice in the present design, such accumulation may not occur at all. In previously proposed apparatus, in which the collet assembly is located entirely radially within the tubular stem or rod of the piston of the ram assembly, the piston rod is necessarily of very greatly increased diameter as compared with that of the present embodiment, and this leads to large voids within the rod in which scale and other foreign matter from the tube being pulled can accumulate. This build-up occurs relentlessly until the pressure thereby exerted produces a distorting effect on the piston rod itself whereby it can no longer slide freely in the bearing corresponding to bearing or block 42, and the assembly jams. When jamming occurs, it is extremely difficult to remove the collet assembly from within the confines of the tubular piston stem.

In the present embodiment, removal of the collet assembly for servicing purposes is very readily accomplished. Cylindrical extension portion 46 is readily removed by virtue of screw-threads 65, thereby leaving collet head 38 exposed. The latter is released by means of grub screw 40 and screw-threads 36, thereby removing the collet assembly in one action. It can be quickly replaced by a previously serviced assembly.

Centre tube or stem 28 is axially fixed in the outward direction (left to right in FIG. 1) by mutual engagement of stepped diameter portions 60 thereon with corresponding stepped internal diameter portions on the cylinder. The cylindrical internal surface 62 is to slidingly receive a mandrel (not shown) and subsequently the external surface of a tube or other article being extracted.

Secondary article gripping means 14 will now be described in more detail.

The secondary article gripping means 14 comprises a gripping collar or plate 64 having a cylindrical internal periphery 66 of which the diameter is slightly larger, by approximately one millimeter, than the diameter of the article to be extracted, and of the associated extraction mandrel (not shown).

Thus the gripping collar has fixed internal dimensions which are slightly larger than the external dimensions of the article to be extracted. Moreover, the collar is mounted in a housing 68 so as to be tiltable relative to the article to be extracted.

Gripping collar 64 is located in housing 68 on a support 70 and between a spring or hydraulically-loaded plunger 72 and a hardened heel pin indicated diagrammatically at 74. Thus, the mounting of the gripping collar is such that it is biased by plunger 72 to a tilted position in which its internal diameter 66 engages and grips the article to be extracted. The axially outer ends of its cylindrical internal diameter are not machined to a sharp edge, but are slightly radiused.

A latch 76 biased by a spring 78 to a latched condition engages a corresponding latch member 80 on cylinder 20 and serves to retain gripping collar 64 and provide access thereto for releasing the same if jammed and for replacing it with an alternative collar of different dimensions for different tube sizes.

Operation of apparatus 10 will now be described.

First a mandrel (not shown) in the form of a cylindrical rod having a tapered helical thread at one end and a drive boss at the other is offered up to a tube to be extracted and screwed into the same by means of a torque wrench. Then, apparatus 10 is offered up to the projecting mandrel and the shank of the latter is inserted into reaction collar 18 and hence through gripping collar 64 and through centre tube 28 until it reaches collet 48. By sufficiently loading the apparatus 10 against the mandrel, the collet and the entire assembly of head 38, piston rod 34 and piston 24 are moved axially outwards until the collet can ride up tapering periphery 52 of the head 38 and allow the mandrel to pass through it. In this condition, the apparatus 10 is held with reaction collar 18 firmly against the plate or body (not shown) in which the tube to be extracted is mounted. Then, fluid pressure is applied to the head side of piston 24, exerting a thrust on the assembly from left to right as seen in FIG. 1. This thrust is applied to the tube via collet 48, and the thrust increases until it is sufficient to break the anchorage of the tube, and the latter then moves from left to right as seen in FIG. 1 while cylinder 20 and collar 18 remain axially fixed.

At the end of a stroke of about two and a half inches, the piston is recycled by application of pressure to rod-side chamber 44, and collet 48 allows the mandrel to pass through it in the outward direction. When the piston reaches the FIG. 1 position again, the cycle is repeated, and so on.

During the return movement of the piston to the FIG. 1 position, gripping collar 64 operates to provide two functions. Firstly it provides a non-return function for the tube being extracted. The tube itself has a degree of resilience and tends to return from right to left as soon as the load is released. Such return movement is prevented by the collar which tilts and engages and grips the tube, and the load is transferred to cylinder 20 and thence to reaction collar 18 via heel pin 74. Secondly, the gripping collar provides the function of preventing the rear of the apparatus (reaction collar 18) moving forward on the return stroke i.e. no manual assistance is needed to hold collar 18 against the tube plate from which the tube is being extracted. Otherwise, the cylinder 20 might reciprocate.

Amongst other advantages provided by the above embodiment, it will be noted that gripping collar 64 is of very simple construction, very easy to use, and occupies a minimun of axial space. In this latter regard it is to be compared with collet 48, which is a relatively complex structure requiring springs and tapered surfaces, and a significant number of associated components.

The advantages of the collet assembly 38, 48 have already been discussed above.

Amongst other modifications which could be provided in the above embodiment is the use of a gripping collar corresponding to collar 64 at the opposite end of the apparatus, in place of the collet 48. Indeed the collar can be used at either or both ends of the apparatus.

It will be noted that the degree of tilt of the gripping collar is relatively small. This corresponds to the small difference in diameters of the parts concerned. This may be varied to suit different applications of the invention.

The collar need not necessarily have a cylindrical internal surface but may be adapted as necessary or desirable to grip articles of differing forms and sizes.

Figure 6:
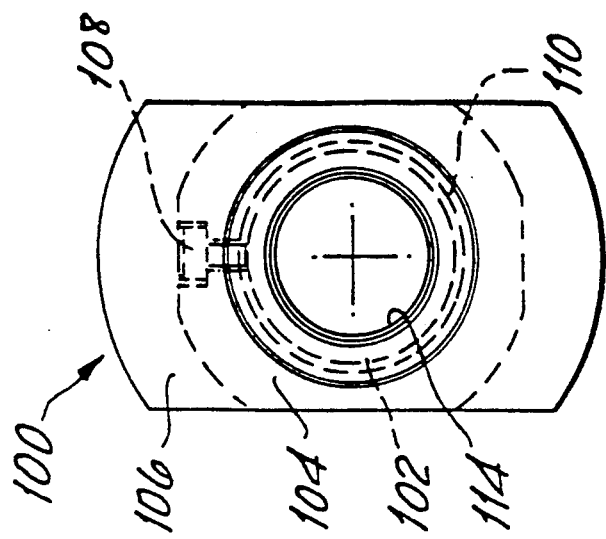
FIG. 6 shows an end elevation view of the collar of FIG. 5, as viewed in the direction of arrow VI in FIG. 5.
Figure 5:
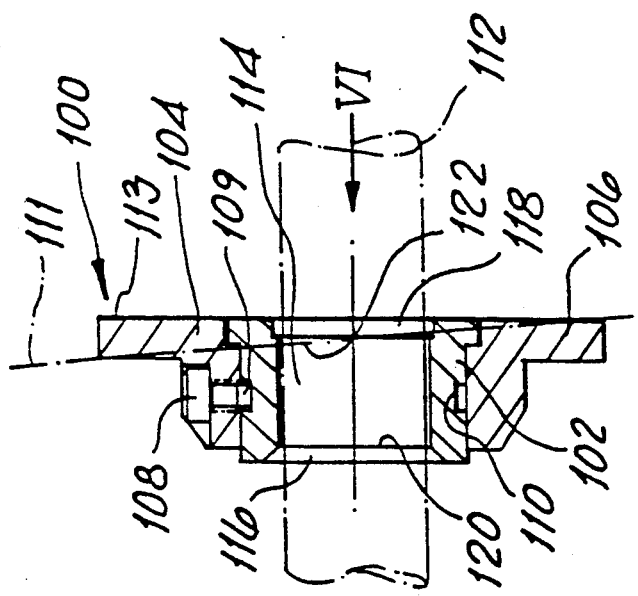
FIG. 5 shows a section through a modified gripping collar or lockplate for use in the preceding embodiments.

In the embodiment of FIGS. 5 and 6 there is shown in more detail a gripping collar or lockplate 100 suitable for use in the preceding embodiments. The collar comprises an inner hub 102 which fits within an outer collar or lockplate body 104 having a radial flange portion 106 engageable with plunger 72.

Hub 102 is removably secured within body 104 by means of a series of grub screws 108 having reduced diameter end portions 109 entering and locating in an annular groove 110 formed in hub 102. In this way, the hub can be removed and replaced in order to accommodate tubes of differing diameters, or rotated in flange portion 106 to present a new locking edge to the tube, when worn.

FIG. 5 shows the relationship between the hub 102 and an associated tube 112, to be extracted. The hub is indicated in two positions, angularly inclined with respect to each other, these indicating the relative angular inclination sufficient to cause gripping or locking by the collar 100. The inclined gripping or locking position is indicated merely by the broken line 111 in FIG. 5, which represents the attitude of face 113 of flange 106 in the inclined position of the hub.

In use, this embodiment functions substantially identically to the previously described embodiments.

It will be noted that the internal surface 114 of hub 102 has a bevelled face 116 at one end and a slightly relieved annulus 118 at its other axial end, whereby the gripping action of the hub with respect to a tube 112 is exerted by the cylindrical inner face 114 and its end edges 120, 122. The degree of lock can be varied by supplying a hub with a pre-defined distance between edges 120 and 122 and a pre-defined clearance between the tube to be acted on and the hub internal diameter.

I claim:
1. Apparatus for effecting stepwise lengthwise movement of elongated articles, said apparatus comprising:
   a) primary article gripping means,
   b) fluid actuator means to apply to said primary article gripping means an extraction load to be applied to an article to be moved in a lengthwise direction to effect extraction movement thereof,
   c) secondary article gripping means comprising a gripping collar to encircle and engage and grip said article by tilting relative thereto;
   d) biasing means for urging said collar into a titled position such that movement of the article in a return direction is inhibited,
   e) said primary and secondary said article gripping means being independently operable in sequence to apply, respectively, an extraction load in one direction and then a non-return gripping effect to inhibit elastic return movement of a tube being extracted, and/or to inhibit axial movement of the main body of the apparatus between successive extraction steps,
   f) said fluid operated actuator comprising a piston and cylinder arranged of annular configuration co-axially and around the lengthwise tube-pulling axis of the apparatus, and an annular piston rod provided intermediate said primary and secondary gripping means,
   g) said primary gripping means, which applies an extraction load to a tube to be extracted, comprising a series of radially-movable jaw elements which are circumferentially spaced about the periphery of the tube in use, and said primary and secondary gripping means provided in a common housing.

2. The apparatus of claim 1 wherein said annular piston rod having a central bore adapted to fit around a tube to be extracted.

3. The apparatus of claim 2 wherein said primary gripping means comprises a collet chuck assembly which fits on an outer surface of said piston rod at said one end thereof.

4. The apparatus of claim 3 further characterized by quick attach means to connect said collet chuck assembly to said piston rod.

5. The apparatus of claim 4 characterized by said quick attach means comprising screw-threaded means provided on the outer surface of said piston rod and on a corresponding inner surface of said collet chuck assembly.

6. The apparatus of claim 3 wherein said collet chuck assembly includes individual axially-extending compression springs provided for said jaw elements and acting between said chuck assembly and the jaw elements to bias the latter inwardly.

* * * * *